(12) United States Patent
Rühl et al.

(10) Patent No.: US 6,388,149 B2
(45) Date of Patent: May 14, 2002

(54) PROCESS FOR REACTING AN ORGANIC COMPOUND IN THE PRESENCE OF A SUPPORTED RUTHENIUM CATALYST

(75) Inventors: Thomas Rühl, Frankenthal; Boris Breitscheidel, Limburgerhof; Jochem Henkelmann, Mannheim; Andreas Henne, Neustadt; Rolf Lebkücher, Mannheim; Konrad Knoll, Ludwigshafen; Paul Naegele, Otterstadt; Hermann Gausepohl, Mutterstadt; Sabine Weiguny, Freinsheim; Norbert Niessner, Friedelsheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/726,250

(22) Filed: Nov. 30, 2000

Related U.S. Application Data

(62) Division of application No. 08/877,820, filed on Jun. 16, 1997, now Pat. No. 6,248,924.

(30) Foreign Application Priority Data

Jun. 19, 1996 (DE) .......................... 196 24 485
Jun. 21, 1996 (DE) .......................... 196 24 835

(51) Int. Cl.$^7$ .................................................. C07C 5/03
(52) U.S. Cl. .................. 585/254; 585/255; 585/273; 585/274; 585/275; 585/276; 528/490; 526/335; 526/340; 526/340.1; 526/340.4; 526/341; 526/342
(58) Field of Search ................................ 585/254, 255, 585/273, 274, 275, 276; 528/490; 526/335, 340, 340.1, 340.4, 341, 342

(56) References Cited

U.S. PATENT DOCUMENTS 5,110,779 A * 5/1992 Hueul ..................... 502/185

* cited by examiner

Primary Examiner—Peter O'Sullivan
(74) Attorney, Agent, or Firm—Keil & Weinkauf

(57) ABSTRACT

A process for the reaction of an organic compound in the presence of a catalyst comprising, as active metal, ruthenium alone or together with at least one Group Ib, VIIb, or VIIIb metal in an amount of from 0.01 to 30 wt %, based on the total weight of the catalyst, applied to a support, wherein from 10 to 50% of the pore volume of the support comprises macropores having a pore diameter in the range of from 50 nm to 10,000 nm and from 50 to 90% of the pore volume of the support comprises mesopores having a pore diameter in the range of from 2 to 50 nm, the sum of said pore volumes being 100%, and said catalyst as such.

8 Claims, No Drawings

PROCESS FOR REACTING AN ORGANIC COMPOUND IN THE PRESENCE OF A SUPPORTED RUTHENIUM CATALYST

This is a Divisional application of application Ser. No. 08/877,820, filed on Jun. 16, 1997, now U.S. Pat. No. 6,248,924.

The present invention relates to a process for reacting an organic compound in the presence of a catalyst which comprises ruthenium and optionally one or more further Group Ib, VIIb, or VIIIb metals, applied to a porous support, as active metal(s).

In one embodiment the present invention relates to a process for the reaction, preferably hydrogenation, of an aromatic compound in which at least one hydroxyl group is attached to an aromatic core, where preferably at least one optionally substituted $C_1$–$C_{10}$-alkyl group and/or at least one $C_1$–$C_{10}$-alkoxy group is attached to an aromatic core in addition to said at least one hydroxyl group. Furthermore, monoalkyl-substituted phenols are preferably used in the process of the invention.

The mononuclear or polynuclear aromatic compounds are preferably hydrogenated in the presence of the catalyst that is described herein to produce the corresponding cycloaliphatic compounds, during which process the hydroxyl group remains intact.

Cycloaliphatic alcohols, and particularly alkylcyclohexanols, are important intermediates for the preparation of various perfumes, medicines and other organic fine chemicals. The above cycloaliphatic alcohols are readily obtained by catalytic hydrogenation of the corresponding aromatic precursors.

The method of preparing alkylcyclohexanols by catalytic hydrogenation of the corresponding alkylphenols is known. The hydrogenation of alkylphenols to form the corresponding alkylcyclohexanols in the presence of hydrogenation catalysts, particularly catalysts that are applied to supports, has been described in many places.

The catalysts used are metallic rhodium, rhodium/platinum and rhodium/ruthenium alloys, and also ruthenium, palladium, or nickel on catalyst supports. The catalyst supports used are carbon, barium carbonate, and, particularly, aluminum oxide.

PL 137,526 describes the hydrogenation of p-tert-butylphenol to form p-tert-butylcyclohexanol using a nickel catalyst.

DE-A 3,401,343 and EP 0,141,054 describe a process for the preparation of 2- and 4-tert-butylcyclohexanol from 2- and 4-tert-butylphenol by catalytic hydrogenation. The hydrogenation is carried out in two stages, a palladium catalyst on a $Al_2O_3$ support being used in the first stage and a ruthenium catalyst on a $Al_2O_3$ support being used in the second stage. The metal content on the support is from 0.1 to 5 wt.-%. The supports are not specified. The process is carried out under a pressure of 300 bar with recycling of the product, and there are preferably obtained the cis-tert-butylphenols, during which process from 0.1 to 0.5% of by-products are formed.

U.S. Pat. No. 2,927,127 describes a process for the preparation of p-tert-butylcyclohexanol and esters thereof by catalytic hydrogenation of p-tert-butylphenol. The catalysts used are 5% of rhodium on carbon, 5% of palladium on barium carbonate and 5% of ruthenium on carbon. When using ruthenium on carbon the process has been carried out under a pressure of from 70 to 120 bar and at a temperature of from 74° C. to 93° C. The hydrogenation product obtained comprised 66% of cis-isomer.

DE-A 2,909,663 describes a process for the preparation of cis-alkylcyclohexanols by catalytic hydrogenation of the corresponding alkylphenols. The catalyst used was ruthenium on a $Al_2O_3$ support. The process was carried out under pressures of 40, 60, and 80 bar. The products obtained were predominantly cis-alkylcyclohexanols, whilst the by-product obtained comprised from 0.1 to 1% of alkyl benzenes.

In a further embodiment the present invention relates to a process for the reaction, preferably hydrogenation, of an aromatic compound in which at least one amino group is attached to an aromatic core, where preferably at least one optionally substituted $C_1$–$C_{10}$ alkyl group and/or at least one $C_1$–$C_{10}$ alkoxy group is attached to an aromatic core in addition to said at least one amino group. In particular, monoallyl-substituted amines are preferably used.

The mononuclear or polynuclear aromatic compounds are preferably hydrogenated to the corresponding cycloaliphatic compounds in the presence of the catalyst that is described herein, during which process the amino group remains intact.

Cycloaliphatic amines, and particularly optionally substituted cyclohexylamines and dicyclohexylamines, are used for the preparation of age protectors for caoutchoucs and plastics materials, as anticorrosive agents and also as intermediates for plant protectants and textile auxiliaries. Moreover cycloaliphatic diamines are used in the manufacture of polyamide and polyurethane resins and are also used as curing agents for epoxy resins.

It is known to be possible to prepare cycloaliphatic amines by catalytic hydrogenation of the corresponding mononuclear or polynuclear aromatic amines. The hydrogenation of aromatic amines to form the corresponding cycloaliphatic amines in the presence of hydrogenation catalysts, particularly catalysts that are applied to supports, has been described in many places.

The catalysts used are for example Raney cobalt containing basic additives (JP 43/3180), nickel catalysts (U.S. Pat. No. 4,914,239, DE 805,518), rhodium catalysts (BE 739,376, JP 7,019,901, JP 7,235,424), and also palladium catalysts (U.S. Pat. No. 3,520,928, EP 501,265, EP 53,818, JP 59/196843). In most cases, however, catalysts containing ruthenium are used.

DE 2,132,547 describes a process for the hydrogenation of mononuclear or polynuclear aromatic diamines to produce the corresponding cycloaliphatic amines which is carried out in the presence of a suspended ruthenium catalyst.

EP 67,058 describes a process for the preparation of cyclohexylamine by catalytic hydrogenation of the corresponding aromatic amine. The catalyst used is ruthenium metal in a finely divided state on activated aluminum pellets. After four recyclings the catalyst began to lose its activity.

EP 324,984 relates to a process for the preparation of a mixture of optionally substituted cyclohexylamine and optionally substituted dicyclohexylamine by hydrogenation of optionally substituted aniline using a catalyst containing ruthenium and palladium on a support which, moreover, contains an alkaline reacting alkali metal compound acting as modifier. A basically similar process is described in EP 501,265, where the catalyst contains niobic acid, tantalic acid, or a mixture of the two, as modifier.

U.S. Pat. No. 2,606,925 describes a process for the preparation of an aminocyclohexyl compound by hydrogenation of a corresponding aromatic compound where a ruthenium catalyst is used, whose active catalytic component is selected from elementary ruthenium, ruthenium oxides, and ruthenium salts in which the ruthenium is present in the anion or in the cation. As revealed by the examples of said process, the catalyst is prepared and dried in a separate stage and is intoduced into the reaction vessel after a relatively long drying time.

A further process for the preparation of cyclohexylamine is described in U.S. Pat. No. 2,822,392, and the main feature of this patent specification involves the use of a specific reactor in which the aniline and hydrogen used as starting products are caused to react with each other countercurrently.

U.S. Pat. Nos. 3,636,108 and 3,697,449 relate to the catalytic hydrogenation of aromatic compounds containing nitrogen using a ruthenium catalyst which additionally contains an alkali metal compound acting as modifier.

Common to all of the above processes is the use of mesoporous supports having surface areas (BET) which are typically between 50 and more than 1000 $m^2/g$ in order to achieve a high activity of the catalyst.

Furthermore, apart from the high cost of the catalyst, it has been found to be a disadvantage, particularly during hydrogenation using a rhodium-containing catalyst, that relatively large amounts of alkyl benzenes and other, unidentifiable compounds which are formed as decomposition products or by-products during hydrogenation frequently occur during such reactions. These by-products restrain working-up and purification of the reaction product particularly when alkylcyclohexanols are to be used, eg, as perfumes or for the preparation of perfumes. Furthermore, the activity of many catalysts used in the above processes declines rapidly, particularly when the hydrogenation is carried out for the acceleration of the reaction velocity at relatively high temperatures.

In a further embodiment thereof, the present invention relates to a process for reacting, preferably hydrogenating, polymers having groups to be reacted, preferably having nitrile groups by using a catalyst comprising ruthenium as described herein.

Processes for the hydrogenation of polymers comprising at least one unit to be hydrogenated are known as such. One group of polymers, which has been used in the past particularly intensively as starting materials in processes for hydrogenating polymers are polymers comprising nitrile groups. Also in the process according to the invention these polymers are preferably used leading to the corresponding polymers comprising amino groups.

The polymers having amino groups as obtained by this process may be used as e.g. branching agents, cross-linking agents or complexing agents, aming which as preferred applications for such polymers the paper manufacture, detergent industry, adhesives and cosmetics are exemplarily to be mentioned.

In the past a plurality of systems for the reduction of polymers comprising nitrile groups in order to obtain polymers comprising amino groups have been described. Among those also the hydrogenation by means of hydrogen has to be mentioned besides the reduction using complex metal hydrides, as e.g. described in the German patents DE 1 226 303 and DE 2 905 671.

The hydrogenation by means of hydrogen is significantly less expensive and—in contrast to the reduction by means of complex metal hydrides—only catalytic amounts of a metal containing component is required, which has economical and ecological advantages.

In the past, the hydrogenation by means of hydrogen was carried out either homogeneously catalyzed or heterogeneously catalyzed.

The homogeneous catalysis is chemically elegant, but the separation of the catalyst is significantly more elaborate compared to the heterogeneous catalysis. The use of a homogeneous catalyst is particularly disadvantageous in catalytic processes using polymers, since a distillative separation of the polymeric product from the catalyst is not possible. If the polymeric product is to be separated from the homogeneous catalyst by crystallization or precibitation, repeated crystallization is required, since inclusions of the catalyst occur, which leads to prolonged duration and higher costs.

Problems attributed to the separation of the catalyst do not occur in heterogeneous-catalyzed reactions. However, the known heterogeneous-catalyzed processes for the hydrogenation of polymers comprising nitrile groups, as carried out mostly by using metal solid bed catalysts according to Raney often only lead to poor yields and selectivities.

U.S. Pat. No. 2,456,428 describes the hydrogenation of poly(acrylonitrile), poly(methacrylonitrile) and similar polymers. After the hydrogenation in the presence of Raney nickel as a catalyst, none-reacted polymer has to be separated prior to the further work-up. Conclusively, the reaction described therein did not run quantitatively, the yields achieved by said process are poor.

According to U.S. Pat. No. 3,122,526, which relates to the hydrogenation of cyano-ethylated poly(acrylonitrile) by using Raney nickel as a catalyst, also only moderate yields of the corresponding amine of below 10% are obtained.

U.S. Pat. No. 2,585,583 describes the hydrogenation of copolymers of butadiene and acrylonitrile and methacrylonitrile, respectively, by using suspension hydrogenation catalysts. The U.S. Pat. No. 2,647,146 describes the hydrogenation of butadiene oligomers having nitrile end groups by using a mixture of two suspension catalysts (Pd on carbon and Ni on diatomaceous earth). According to these two processes the respectively used catalysts have to be separated from the reaction solution by filtration.

Summarizing the above, it has to be stated that the hydrogenation of polymers comprising nitrile groups in order to obtain polymers comprising amino groups is known as such, however, good yields of polymers comprising amino groups have been up to now only obtained by using suspension catalysts. However, these have to be separated from the reaction solution by filtration and may not be used in a solid bed reactor.

In a further embodiment thereof, the present invention relates to a process for the hydrogenation of polymers containing C—C multiple bonds in the presence of a catalyst containing ruthenium or palladium and optionally one or more other Group Ib, VIIb, or VIIIb metals as active metals on a porous support.

Polymers having C—C multiple bonds, such as polybutadiene, poly(styrene-co-butadiene)s, poly(styrene-co-isoprene)s, poly(acrylonitrile-co-butadiene)s, etc. have great industrial significance, particularly for applications involving food packaging, impact-resistant materials, adhesives, etc. Their unsaturated regions make these polymers sensitive to thermal and oxidative degradation, with the result that they usually show poor resistance to atmospheric degradation. Polymers in which the C—C multiple bonds, such as C—C double bonds, have been hydrogenated, usually show a distinct improvement in stability.

In the past, a large number of homogeneous and heterogeneous catalysts has been described for this hydrogenation.

Processes involving hydrogenation using homogeneous catalysts, as described for example in U.S. Pat. Nos. 3,595,295, 3,595,942, 3,700,633 and 3,810,957, exhibit a high degree of selectivity toward the hydrogenation of unsaturated C—C bonds, ie any aromatic regions present in said polymers are left virtually unhydrogenated. Such processes suffer however from the drawback that the catalyst used in dissolved form can be separated from the desired product only by using elaborate working-up stages, which increases the process costs to an undesirable extent.

When hydrogenation is carried out using heterogeneous catalysts, the problem of catalyst separation does not occur. Such catalyst systems, as described in, eg, U.S. Pat. No. 3,333,024 and the Belgian Patent Application No. 871,348, exhibit distinctly less selectivity than hydrogenations carried out using homogeneous catalysts, that is to say, any aromatic regions present in the polymers are also hydrogenated to a significant extent.

For this reason heterogeneous catalysts have in the past been sought which are capable of selectively hydrogenating ethylenic double bonds in polymers.

Thus GB-A 2,061,961 describes a suspension catalyst consisting of 5% rhodium on activated charcoal, but this can be used for the hydrogenation of triple-block poly(styrene-co-butadiene)s only up to a molecular weight of 60,000.

U.S. Pat. No. 4,560,817 describes selective hydrogenation of poly(styrene-co-butadiene)s using a catalyst partially poisoned by an alkali metal or alkaline earth metal alkoxide, in which process the polymer is caused to react, during hydrogenation, with a mixture of hydrogen and ammonia or an organic amine. In order to achieve sufficient activity, the hydrogenation temperatures are near the decomposition temperature of the polymers.

A catalyst consisting of a macroporous support material to which a Group VIIIb metal is applied, which can be used for the hydrogenation of carbon-carbon double bonds, is described in U.S. Pat. No. 5,110,779. Ninety percent of the pores that are present in the support material of the catalyst described in said reference possess a diameter of greater than 100 nm. The ratio of the surface area of the metal to that of the support is from 0.07 to 0.75:1. In said patent specification particularly emphasis is placed on the large surface area of the metal compared with that of the support, and this is stated to be surprising, since such a catalyst still possesses high activity.

Furthermore, the present invention relates in particular to a process for the reaction, preferably hydrogenation, of an organic compound comprising at least one C=O-group, such as a ketone, aldehyde, a carboxylic acid or a derivative thereof, or a mixture of two or more thereof.

It is thus an object of the present invention to provide a process for the reaction, preferably hydrogenation, of an organic compound as defined above where very high yields or almost quantitative conversions are achieved.

Another object of the invention is to provide such a process in which only a minimum content of by-products or decomposition products is formed during hydrogenation.

It should also be possible to carry out the process operating at high space velocities and with long on-stream times at an extremely high turnover number, the corresponding hydrogenation products being obtained in high yield and purity.

One or more of the above objects is/are achieved with a process for the reaction, preferably hydrogenation of an organic compound in the presence of a catalyst comprising, as active metal, ruthenium alone or together with at least one Group Ib, VIIb, or VIIIb metal in an amount of from 0.01 to 30 wt %, based on the total weight of the catalyst, applied to a support, wherein from 10 to 50% of the pore volume of the support comprises macropores having a pore diameter in the range of from 50 nm to 10,000 nm and from 50 to 90% of the pore volume of the support comprises mesopores having a pore diameter in the range of from 2 to 50 nm, the sum of said pore volumes being 100%.

In another embodiment, the present invention relates to a process for the reaction, preferably hydrogenation of polymers containing C—C multiple bonds in the presence of a catalyst comprising, as active metal, ruthenium alone or together with at least one Group Ib, VIIb, or VIIIb metal in an amount of from 0.01 to 30 wt %, based on the total weight of the catalyst, applied to a support, or in the presence of a catalyst comprising, as active metal, palladium alone or together with at least one Group Ib, VIIb, or VIIIb metal in an amount of from 0.01 to 30 wt %, based on the total weight of the catalyst, applied to a support, wherein the catalysts are respectively characterized in that from 10 to 50% of the pore volume of the support comprises macropores having a pore diameter in the range of from 50 nm to 10,000 nm and from 50 to 90% of the pore volume of the support comprises mesopores having a pore diameter in the range of from 2 to 50 nm, the sum of said pore volumes being 100%.

The above objects and any other objects of the invention are achieved by the processes for reaction, preferably hydrogenation as described in the sub-claims. One special advantage of the process of the invention is that very good results are attained when using only small metal contents in the catalyst.

Furthermore, the process of the invention exhibits high turnover numbers at high space velocities over long catalyst on-stream times. The space velocity is the space-time yield of the process, ie the weight of the educt that is caused to react per unit of time per unit weight of the catalyst present. The "on-stream time" is the time during which that weight of educt is caused to react which can just be catalyzed by the catalyst without the latter suffering any change in properties and without the properties of the product being significantly modified.

Furthermore, the present invention relates to the catalyst as defined herein, i.e. a catalyst comprising, as active metal, ruthenium alone or together with at least one Group Ib, VIIb, or VIIIb metal in an amount of from 0.01 to 30 wt %, based on the total weight of the catalyst, applied to a support, or a catalyst comprising, as active metal, palladium alone or together with at least one Group Ib, VIIb, or VIIIb metal in an amount of from 0.01 to 30 wt %, based on the total weight of the catalyst, applied to a support, wherein the catalysts are respectively characterized in that from 10 to 50% of the pore volume of the support comprises macropores having a pore diameter in the range of from 50 nm to 10,000 nm and from 50 to 90% of the pore volume of the support comprises mesopores having a pore diameter in the range of from 2 to 50 nm, the sum of said pore volumes being 100%.

Compounds

The term "organic compound" as used within the present invention comprises all organic compounds including low molecular weight (monomeric) and polymeric organic compounds which may be catalytically reacted, in particular those which exhibit groups which are treatable with hydrogen, such as C—C-double or C—C-triple bonds. This term comprises low molecular weight organic compounds as well as polymers. "Low molecular weight organic compounds" are compounds having a molecular weight of below 500. The term "polymer" is defined as relating to molecules having a molecular weight of higher than about 500.

The present invention relates particularly to a process for reacting an organic compound in the presence of a catalyst as defined herein, wherein the reaction is a hydrogenation, dehydrogenation, hydrogenolysis, aminating hydrogenation or dehalogenation, more preferably a hydrogenation.

In particular, organic compounds having one or more of the following structural units may be used:

$$C=C \quad (I)$$

$$C\equiv N \quad (II)$$

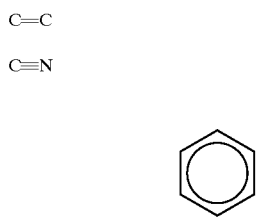
(III)

$$C=N \quad (IV)$$

$$C\equiv N \quad (V)$$

$$C=O \quad (VI)$$

$$C=S \quad (VII)$$

$$-NO_2 \quad (VIII)$$

The process of the invention is particularly suitable for reacting, preferably hydrogenating, an organic compound which is selected from the group consisting of an aromatic compound in which at least one hydroxyl group is bonded to an aromatic ring, an aromatic compound in which at least one amino group is bonded to an aromatic ring, a ketone, an aldehyde, a carboxylic acid or a derivative thereof, a polymer comprising at least one C—C double bond, a polymer comprising at least one C=O-group, a polymer comprising at least one C≡N-group, and a mixture of two or more thereof.

Within the process of the invention organic compounds comprising units of different structures, as defined above, may be reacted, such as organic compounds which exhibit C—C-multiple bonds and carbonyl groups, since the catalyst used within the process of the invention are capable to first selectively hydrogenate one of the two groups, i.e. to achieve a hydrogenation of these groups from about 90 to 100%, while at first the other groups are reacted, preferably hydrogenated, to an extent of less than 25% and in general 0 to about 7%. Generally, first the C—C-multiple bond and subsequently the C=O-group are reacted, e.g. hydrogenated, respectively.

The term "aromatic compound in which at least one hydroxyl group is bonded to an aromatic ring" or "aromatic compound in which at least one amino group is bonded to an aromatic ring" means all compounds which have a unit of the structure (I):

(I)

where R is a hydroxyl group or an amino group.

If, in the process of the present invention, use is made of aromatic compounds in which at least one hydroxyl group and also at least one unsubstituted or substituted $C_1$–$C_{10}$-alkyl radical and/or $C_1$–$C_{10}$-alkoxy radical is bonded to an aromatic ring, the resulting isomer ratio of cis to trans products can be varied within a wide range, depending on the reaction conditions (temperature, solvent). Furthermore, the compounds obtained can be processed further without further purification steps, since the formation of alkylbenzenes is virtually completely avoided.

Like the above-described compounds in which at least one hydroxyl group is bonded to an aromatic ring, aromatic compounds in which at least one amino group is bonded to an aromatic ring can also be hydrogenated by the process of the present invention to give the corresponding cycloaliphatic compounds with high selectivity. For the amines additionally substituted by a $C_1$–$C_{10}$-alkyl radical and/or $C_1$–$C_{10}$-alkoxy radical, what has been said above regarding the ratio of the cis and trans isomers also applies.

In particular, this embodiment virtually completely avoids the formation of deamination products such as cyclohexanes or partially hydrogenated dimerization products such as phenylcyclohexylamines.

In detail, the following compounds may be reacted with the process of the invention:

Aromatic Compounds in which at Least One Hydroxyl Group is Bonded to an Aromatic Ring Aromatic compounds in which at least one hydroxyl group and preferably also at least one unsubstituted or substituted $C_1$–$C_{10}$-alkyl radical and/or alkoxy radical is bonded to an aromatic ring can be reacted, preferably hydrogenated, by means of the process of the present invention to give the corresponding cycloaliphatic compounds, with it also being possible to use mixtures of two or more of these compounds. The aromatic compounds used can be monocyclic or polycyclic aromatic compounds. The aromatic compounds contain at least one hydroxyl group bonded to an aromatic ring; the simplest compound of this group is phenol. The aromatic compounds preferably have one hydroxyl group per aromatic ring and can be substituted on the aromatic ring or rings by one or more alkyl and/or alkoxy radicals, preferably $C_1$–$C_{10}$-alkyl and/or alkoxy radicals, particularly preferably $C_1$–$C_{10}$-alkyl radicals, in particular methyl, ethyl, propyl, isopropyl, butyl, isobutyl and tert-butyl radicals; among the alkoxy radicals, preference is given to $C_1$–$C_8$-alkoxy radicals such as the methoxy, ethoxy, propoxy, isopropoxy, butoxy, isobutoxy and tert-butoxy radicals. The aromatic ring or rings and also the alkyl and alkoxy radicals may be unsubstituted or substituted by halogen atoms, in particular fluorine atoms, or other suitable inert substituents.

Preferably, the compounds which can be reacted, preferably hydrogenated, according to the present invention have at least one, preferably from one to four, in particular one, $C_1$–$C_{10}$-alkyl radical which is preferably located on the same aromatic ring as the hydroxyl group or groups. Preferred compounds are (mono)alkylphenols, where the alkyl radical can be in the o, m or p position relative to the hydroxyl group. Particular preference is given to trans-alkylphenols, also known as 4-alkylphenols, where the alkyl radical preferably has from 1 to 10 carbon atoms and is, in particular, a tert-butyl radical. Preference is given to 4-tert-butylphenol. Polycyclic aromatic compounds which can be used according to the present invention are, for example, β-naphthol and α-naphthol.

The aromatic compounds in which at least one hydroxyl group and preferably also at least one unsubstituted or substituted $C_1$–$C_{10}$-alkyl radical and/or alkoxy radical is bonded to an aromatic ring can also have a plurality of aromatic rings which are linked via an alkylene radical, preferably a methylene group. The alkylene group, preferably methylene group, which forms the linkage can have one or more alkyl substituents which can be $C_1$–$C_{20}$-alkyl radicals and are preferably $C_1$–$C_{10}$-alkyl radicals, particularly preferably methyl, ethyl, propyl, isopropyl, butyl or tert-butyl.

In these compounds, each of the aromatic rings can bear at least one bonded hydroxyl group. Examples of such compounds are bisphenols, which are linked in the 4 position via an alkylene radical, preferably a methylene radical.

In the process of the present invention, particular preference is given to reacting a phenol substituted by a $C_1$–$C_{10}$-alkyl radical, preferably $C_1$–$C_6$-alkyl radical, where the alkyl radical may be unsubstituted or substituted by an aromatic radical, or mixtures of two or more of these compounds.

In a further preferred embodiment of this process, p-tert-butylphenol, bis(p-hydroxyphenyl)dimethylmethane or a mixture thereof is reacted.

Aromatic Compounds in which at Least one Amino Group is Bonded to an Aromatic Ring The process of the present invention also enables aromatic compounds in which at least one amino group is bonded to an aromatic ring to be reacted, preferably hydrogenated, to give the corresponding cycloaliphatic compounds, with mixtures of two or more of these compounds also being able to be used. The aromatic compounds can be monocyclic or polycyclic aromatic compounds. The aromatic compounds contain at least one amino group which is bonded to an aromatic ring. The aromatic compounds are preferably aromatic amines or diamines and can be substituted on the aromatic ring or rings or on the amino group by one or more alkyl and/or alkoxy radicals, preferably $C_1$–$C_{20}$-alkyl radicals, in particular methyl, ethyl, propyl, isopropyl, butyl, isobutyl and tert-butyl radicals. Among the alkoxy radicals, preference is given to $C_1$–$C_8$-alkoxy radicals such as methoxy, ethoxy, propoxy, isopropoxy, butoxy, isobutoxy and tert-butoxy radicals. The aromatic ring or rings and also the alkyl and alkoxy radicals can be unsubstituted or substituted by halogen atoms, in particular fluorine atoms, or other suitable inert substituents.

The aromatic compound in which at least one amino group is bonded to an aromatic ring can also have a plurality of aromatic rings which are linked via an alkylene group, preferably a methylene group. The alkylene group, preferably methylene group, which forms the linkage can bear one or more alkyl substituents which can be $C_1$–$C_{20}$-alkyl radicals and are preferably $C_1$–$C_{10}$-alkyl radicals, particularly preferably methyl, ethyl, propyl, isopropyl, butyl, sec-butyl or tert-butyl.

The amino group bonded to the aromatic ring may be unsubstituted or substituted by one or two of the above-described alkyl radicals.

Particularly preferred compounds are aniline, naphthylamine, diaminobenzenes, diaminotoluenes and bis-p-aminophenylmethane or mixtures thereof.

Compounds Comprising C=O Groups

Within the process of the invention it is also possible to react, in particular to hydrogenate, compounds comprising C=O groups, i.e. in particular aldehydes, ketones, carboxylic acids and their derivatives, such as carboxylic acid esters, carboxylic acid halides and carboxylic anhydrides, and mixtures of two or more of the above-mentioned compounds.

In particular aldehydes and ketones, preferably those having 1 to 20 C-atoms, such as formaldehyde, acetaldehyde, propionaldehyde, n-butyraldehyde, valeraldehyde, caproaldehyde, heptaldehyde, phenylacetaldehyde, acrolein, crotonaldehyde, benzaldehyde, o-, m-, p-tolualdehyde, salicylic aldehyde, anisaldehyde, vanillin, zinnamic aldehyde, acetone, methyl ethyl ketone, 2-pentanone, 3-pentanone, 2-hexanone, 3-hexanone, cyclohexanone, isophorone, methyl isobutyl ketone, mesityl oxide, acetophenone, propiophenone, benzophenone, benzalacetone, dibenzalacetone, benzalacetophenone, glycol aldehyde, glyoxal, 2,3-butandione, 2,4-pentandione, 2,5-hexandione, terephthalaldehyde, glutaraldehyde, diethylketone, methyl vinyl ketone, acetylacetone, 2-ethylhexanal, or mixtures of two ore more thereof, may be used.

Furthermore, also polyketones, such as copolymers of ethylene and CO are used.

Furthermore, carboxylic acids and derivatives thereof, preferably those having 1 to 20 C-atoms may be reacted. In particular, the following are to be mentioned:

Carboxylic acids, such as formic acid, acetic acid, propanoic acid, butanoic acid, iso-butanoic acid, n-valeric acid, pivalic acid, caproic acid, heptanoic acid, octanoic acid, decanoic acid, lauric acid, myristic acid, palmitic acid, stearic acid, acrylic acid, methacrylic acid, oleic acid, elaidic acid, linoleic acid, linolenic acid, cyclohexane carboxylic acid, benzoic acid, phenylacetic acid, o-, m-, p-toluylic acid, o-, p-chlorotenzoic acid, o-, p-nitrobenzoic acid, salicylic acid, p-hydroxybenzoic acid, anthranilic acid, p-aminobenzoic acid, oxalic acid, malonic acid, succinic acid, glutaric acid, adipic acid, pimelic acid, suberic acid, azelaic acid, sebacic acid, maleic acid, fumaric acid, phthalic acid, isophthalic acid, teraphthalic acid, and mixtures of two or more thereof.

Carboxylic acid halides, such as the chlorides and bromides of the above-mentioned carboxylic acids, in particular acetylchloride or -bromide, stearic acid chloride or -bromide and benzoic acid chloride or -bromide, which are dehalogenated.

Carboxylic acid esters, such as the $C_1$- to $C_{10}$-alkyl esters of the above-mentioned carboxylic acids, particularly methyl formiate, acetic acid ester, butanoic acid butyl ester, dimethyl terephthalate, dimethyl adipate, methyl(meth)acrylate, butyrolactone, caprolactone and polycarboxylic acid esters, such as polyacrylic and polymethacrylic acid esters and copolymers and polyesters thereof, such as poly (methyl(meth)acrylates); these esters are in particular hydrogenated, i.e. the esters are reacted to the corresponding acids and alcohols.

Carboxylic anhydrides, such as anhydrides of the above-mentioned carboxylic acids, in particular acetic acid anhydride, propanoic acid anhydride, benzoic acid anhydride and maleic anhydride.

Carboxylic acid amides, such as amides of the above-mentioned carboxylic acids, such as formamide, acetamide, propionic amide, stearamide and terephthalamide.

In addition thereto, also hydroxy carboxylic acids, such as lactic, malic acid, tartaric acid or citric acid, or amino acids, such as glycine, alanine, proline and arginine may be reacted.

Nitriles

Furthermore, also nitriles, preferably aliphatic or aromatic mono or dinitriles, such as acetonitrile, propionitrile, butyronitrile, stearic acid nitrile, isocrotonic acid nitrile, 3-butinnitrile, 2,3-butadiene nitrile, 2,4-pentadiene nitrile, 3-hexene-1,6-dinitrile, chloracetonitrile, trichloracetonitrile, lactic acid nitrile, phenol acetonitrile, 2-chlorbenzonitrile, 2,6-dichlorobenzonitrile, isophthalonitrile, particularly aliphatic alpha, omega-dinitriles, such as succinonitrile, glutaronitrile, adiponitrile, pimelicnitrile and suberic nitrile or aminonitriles, such as 4-amino butanoic acid nitrile, 5-aminopentanoic acid nitrile, 6-aminohexanoic acid nitrile, 7-aminoheptanoic acid nitrile and 8-aminooctanoic acid nitrile.

Furthermore, within the process according to the invention, the following reactions may be carried out:

The hydrogenation of aromatic compounds, such as benzene, toluenes, xylols, naphthalines and substituted derivatives thereof, leading to the corresponding alicyclic compounds; the hydrogenation of alkenes or alkines, such as ethylene, propylene, 1-, 2-butene, 1-, 2-, 3- and 4-octene, butadiene, and hexatriene leading to the corresponding alkanes; the hydrogenation of nitroalkanes, such as nitroethane, nitromethane, nitropropane and 1,1-dinitroethane leading to the corresponding amines; the hydrogenation of imines, such as quinone imines, ketimines, ketene imines or aliphatic imines, such as propioamine, hexane imine; the dehalogenation of organic compounds which contain halogen atoms, particularly of aromatic halogen-containing compounds, such as chloro- and bromobenzene, bromo- and chlorotoluenes and chloro- and bromo xylols, also including compounds with more than one halogen atoms substituted, may be used; the aminating hydrogenation of i.e. alcohols, such as vinyl alcohol.

Furthermore, within the process of the invention also oximes may be reacted or secondary amines may be prepared starting from ketones and primary amines.

Polymers

The catalysts according to the invention may be also used for the hydrogenation, dehydrogenation, hydrogenolysis, aminating hydrogenation and dehalogenation of large molecules, preferably of polymers.

Accordingly, the present invention also relates to a process for reacting a polymer comprising at least one catalytically reactable group in the presence of the above identified catalyst, wherein the hydrogenation of polymers comprising C=O-groups, such as polyesters of dicarboxylic acids, unsaturated monocarboxylic acids, such as poly(meth) acrylates, olefin/CO-copolymers or polyketones, and the hydrogenation of polymers comprising nitrile groups, such as copolymers of styrene and butadiene, copolymers of acrylonitrile and the aminating hydrogenolysis of polyvinylalcohols and polyketones in the presence of the above-mentioned catalyst are preferred.

In particular, the present invention relates to a process for the hydrogenation of a polymer comprising at least one C=O-group or a polymer comprising at least one C≡N-group.

The term "polymer comprising at least one catalytically reactable group" relates to all polymers comprising such groups, in particular to polymers comprising units having the structures (I) to (VIII), as defined above with respect to the monomeric compounds, or a halogen atom. Needless to say that the referenced polymers comprise the respective unit at least once and that also one or more units of two or more of said structures may be present in the polymer reacted according to the invention.

The average molecular weight of the polymers to be reacted within the process of the invention is generally about 500 to about 500000, preferably about 1000 to about 100000 and more preferably about 1000 to about 50000. It is, however, possible to also react polymers having a higher molecular weight of up to one or several millions. If polymers comprising at least one C—C-multiple bond, i.e. polymers comprising repeating units of the above defined structures (I) and (II) are reacted, these generally exhibit a weight average molecular weight of from about 5000 to about about 1000000, preferably from about 50000 to about 500000 and more preferably from about 150000 to about 500000.

It is preferred to use polymers containing olefinic double bonds, and it is further preferred to use polymers containing diene units and copolymers containing vinylaromatic units and diene units. Within this reaction besides the catalyst comprising ruthenium as the active metal, also the catalyst comprising palladium as the active metal may be used, while for the other reactions described herein preferably the catalyst comprising ruthenium as the active metal is used. It has to be noted in this respect that besides Ru and Pd also the herein defined Group Ib, VIIb, or VIIIb metals, which are of course different from Ru and Pd, respectively, may be used.

Common diene units include all conventional polyunsaturated monomers containing from three to twelve carbon atoms, butadiene being preferred.

Copolymers to be hydrogenated may contain recurring units in random, block, or tapered distribution.

Aromatic monomers which may be present in the polymers to be hydrogenated in the process of the invention include monovinyl-substituted and polyvinyl-substituted aromatic compounds, the preferred monomers being styrene, alpha-methyl styrene, acrylonitrile, methacrylonitrile, and divinyl benzene. Furthermore, mixtures of vinylaromatic and/or diolefin monomers, optionally together with conventional olefinic monomers, can be present in the polymers to be hydrogenated.

As examples for polymers which are to be reacted, preferably hydrogenated, with the process of the invention, the following are to be mentioned:

Polymers having C—C-double bonds, e.g. polybutadienes, such as poly(2,3-dimethylbutadiene), polyisoprene, polyacetylenes and polycylopenta- and -hexadiene; polymers having C—C-triple bonds, such as polydiacetylenes; polymers having aromatic groups, such as polystyrene, terpolymers of acrylonitrile, butadiene and styrene, and copolymers of styrene and acrylonitrile; polymers having C—N-triple bonds, such as polyacrylonitrile, polyacrylonitrile-copolymers with e.g. vinyl chloride, vinylidene chloride, vinyl acetate or (meth)acrylic acid esters or mixtures of two or more thereof as comonomers; polymers having C—O-double bonds, such as polyesters, polyacrylamides, poly(acrylic acids), polyurea and polyketones; polymers having C—S-double bonds, such as polysulfones and polyethersulfones; halogen-containing polymers, such as poly(vinyl chloride) and poly(vinylidene chloride); and polymers containing nitro groups, which may be obtained by nitration of e.g. polyolefins by means of polymer analogous reactions.

Examples for polymers being preferably used within the present invention include polyisoprene, polybutadiene, ethylene/CO-copolymers, propylene/CO-copolymers, poly (methyl(meth) acrylate), polyterephthalate, polyadipate, styrene-butadiene-copolymers, acrylonitrile-butadiene-copolymers, acrylonitrile-styrene-copolymers, styrene-isoprene-styrene-triblockcopolymers, styrene-butadiene-styrene-triblockcopolymers and styrene-butadiene-styrene-starblockcopolymers.

Generally, a complete reaction of the introduced educts is achieved. However, the reaction, preferably hydrogenation, may be also carried out in such a way that by suitably choosing temperature, e.g. $H_2$-pressure and $H_2$-amount only one kind of e.g. groups to be hydrogenated may be reacted, while the other kind of e.g. groups to be hydrogenated are not hydrogenated.

The process of the invention is particularly suitable for reacting, preferably hydrogenating, polymers comprising units of different structure, as defined above, e.g. a polymer comprising C—C-multiple bonds and C=O-groups and/or C≡N-groups, since the catalyst of the present invention is capable to first selectively react the C—C multiple bond, e.g. to achieve a hydrogenation of these groups of about 90 to 100%, while at the same time the C=O-groups and/or C≡N-groups are reacted, e.g. hydrogenated to an extent of less than 25% and in general 0 to about 7%.

Furthermore, the process of the invention is particularly suitable for the hydrogenation of polymers of high molecular weight and containing both C—C multiple bonds and aromatic groups, since the catalysts used in the process of the invention are capable of achieving hydrogenation of the C—C multiple bonds, eg ethylenically unsaturated regions, to an extent of from 90 to 100%, whilst the aromatic regions are hydrogenated to an extent of less than 25% and generally to an extent of from 0% to 7%.

After finishing this reaction, preferably hydrogenation of the C—C-multiple bonds, it is of course possible to nearly quantitatively react, preferably hydrogenate, the other unsaturated groups being present in the polymer, e.g. C=O-groups by further introducing hydrogen.

The process of the invention may be used for already isolated and living polymers.

Catalysts

The catalysts to be used in the process of the invention may be prepared on an industrial scale by applying ruthenium or palladium and optionally at least one Group Ib, VIIb, or VIIIb metal to a suitable support. Application may be effected by impregnating the support material with an aqueous metal salt solution, such as a solution of a ruthenium or palladium salt, by spraying an appropriate metal salt solution on to the support, or by any other suitable method. Suitable ruthenium or palladium salts for the preparation of the ruthenium and palladium salt solutions, and suitable salts of the said Group Ib, VIIb, and VIIIb metals are the nitrates, nitrosylnitrates, halides, carbonates, carboxylates, acetylacetonates, chlorine complexes, nitrito complexes, or amine complexes of said metals, the nitrates and nitrosylnitrates being preferred.

In the case of catalysts that contain other metals in addition to ruthenium or palladium, the metal salts or metal salt solutions can be applied simultaneously or successively.

The supports coated or impregnated with the solution of ruthenium salt, palladium salt, or metal salt are then dried, the preferred temperatures being from 100° C. to 150° C. If desired, these supports can be calcined at temperatures ranging from 200° C. to 600° C., preferably from 350° C. to 450° C. The coated supports are then activated by treatment in a stream of gas containing free hydrogen at temperatures ranging from 30° C. to 600° C. and preferably from 150° C. to 450° C. The stream of gas preferably consists of from 50 to 100 vol % of $H_2$ and from 0 to 50 vol % of $N_2$.

If one or more Group Ib, VIIb, or VIIIb metals are to be applied to the support in addition to ruthenium or palladium, and if the said application thereof is to take place successively, the support can be dried and optionally calcined between each application or impregnation, the drying temperature ranging from 100° C. to 150° C. and the calcining temperature being from 200° C. to 600° C. The order in which the metal salt solutions are applied is arbitrary.

If one or more Group Ib, VIIb, or VIIIb metals are to be applied to the support in addition to ruthenium or palladium, it is preferred to use platinum, copper, rhenium, cobalt, nickel, or mixtures thereof.

The solution of ruthenium salt, palladium salt, or metal salt is applied to the support(s) at such a rate that the content of active metal is from 0.01 to 30 wt %, preferably from 0.01 to 10 wt % and more preferably from 0.01 to 5 wt %, based on the total weight of the catalyst, of ruthenium or palladium and optionally of one or more Group Ib, VIIb, or VIIIb metals applied to the support.

The total metal surface area on the catalyst is preferably from 0.01 to 10 $m^2/g$ and more preferably from 0.05 to 5 $m^2/g$ and most preferably from 0.05 to 3 $m^2/g$ of catalyst. The metal surface area was determined by the chemisorption method, as described in J. Lemaitre et al in "Characterization of Heterogeneous Catalysts", Ed. Francis Delannay, Marcel Dekker, New York (1984), pp 300–324.

In the catalyst used in the process of the invention the ratio of the surface area of at least one active metal to that of the catalyst support is less than approximately 0.3:1, preferably less than approximately 0.1:1 and more preferably approximately 0.05:1 or less, the lower limit being approximately 0.0005:1.

Supports

The support materials used for the preparation of the catalysts to be used in the process of the invention possess macropores and mesopores. The term "macropores" denotes pores having a diamater of more than 50 nm, whilst the term "mesopores" relates to pores having a diameter between approximately 2.0 nm and approximately 50 nm, as defined in Pure Applied Chem. 45,pp 71 et sec, particularly page 79 (1976).

The supports used in the present invention have a pore distribution made up as follows: from approximately 10 to approximately 50%, preferably approximately 15 to approximately 50%, more preferably from 15 to 45% and most preferably from 30 to 40% of the pore volume comprises macropores having a pore diameters ranging from approximately 50 nm to approximately 10,000 nm, whilst approximately 50 to approximately 90%, preferably 50 to approximately 85%, more preferably from 55 to approximately 85% and most preferably from 60 to approximately 70% of the pore volume comprises mesopores having pore diameters ranging from 2 to approximately 50 nm, the sum of the pore volumes being 100%.

Preferably, the surface area of the support is from approximately 500 $m^2/g$, more preferably from approximately 200 to 350 $m^2/g$ and most preferably from approximately 200 to approximately 250 $m^2/g$ of support material.

The surface area of the support is determined by the BET method by $N_2$ absorption as specified in DIN 66131. Determination of the average pore diameter and the distribution of pore sizes is carried out by Hg porosymmetry, particularly as specified in DIN 66133.

Although, generally, all known catalyst support materials can be used, provided they have the pore size distribution defined above, it is preferred to use activated charcoal, silicon carbide, aluminum oxide, silicon dioxide, titanium dioxide, zirconium dioxide, magnesium oxide, zinc oxide, or mixtures thereof, more preferably aluminum oxide and zirconium dioxide.

The catalysts used in the present invention show high reactivity (a high turnover index), selectivity, and a long on-stream time. When the catalysts proposed in the present invention are used for hydrogenation applications, the hydrogenation products are obtained in high yield and purity, so that subsequent purification is unnecessary. The conversion is virtually quantitative. Thus the hydrogenation product obtained can, in a preferred embodiment of the present invention, be directly used in a further processing stage, without having to be purified.

Within the hydrogenation of an aromatic compound in which at least one hydroxyl group is bonded to an aromatic ring, in particular within the hydrogenation of 4-alkyl or 4-alkoxy substituted phenols, as described above, predominantly trans configurated cycloaliphatic compounds are obtained. The content of trans configurated compounds is according to one embodiment of the present invention at least 60%, preferably at least 65%. The convertion is essentially quantitative, the content of residual aromatics is preferably below 0.01 wt.-%, in relation to the total of the produced amount. Acording to a preferred embodiment of the present invention, the obtained hydrogenation product may be directly introduced into its further processing stage, without having to be purified.

Solvents or Diluents

In the process of the invention the reaction, preferably hydrogenation, can be carried out in the absence of a solvent or diluent, i.e. it is not necessary to carry out the reaction in solution.

It is also possible to directly react the polymer in its melt.

Preferably, however a solvent or diluent is used. The solvents or diluents used can be any suitable solvents or diluents. The choice thereof is not crucial. For example, the solvents or diluents can contain small amounts of water, if desired.

In the reaction, preferably hydrogenation, of an aromatic compound in which at least one hydroxyl group is attached to an aromatic core, examples of suitable solvents or diluents include the following:

Straight-chain or cyclic ethers, such as tetrahydrofuran or dioxane, and also aliphatic alcohols in which the alkyl radical exhibits preferably from 1 to 10 carbon atoms and more preferably from 3 to 6 carbon atoms.

Examples of alcohols to be preferably used are isopropanol, n-butanol, isobutanol and n-hexanol. Mixtures of these or other solvents or diluents may also be used.

In the reaction, preferably hydrogenation, of an aromatic compound in which at least one amino group is attached to an aromatic core, examples of suitable solvents or diluents include the following:

Straight-chain or cyclic ethers, such as tetrahydrofuran or dioxane, and also ammonia and monoalkylamines or dialkylamines in which the alkyl radical exhibits preferably from 1 to 3 carbon atoms, such as methylamine, ethylamine, or propylamine, or the corresponding dialkylamines.

Mixtures of these or other solvents or diluents may also be used.

In both of the above embodiments, the amount of the solvent or diluent used is not subject to particular restrictions and can be freely selected as required, but those amounts are preferred which produce a 10 to 70 wt.-% strength solution of the compound to be hydrogenated.

When carrying out the process of the invention it is particularly preferred that the product that is formed in the reaction, preferably hydrogenation of this process be used as solvent, optionally together with other solvents or diluents. In this case a portion of the product that is formed in the process can be mixed with the compounds to be reacted, preferably hydrogenated. The weight of hydrogenation product admixed as solvent or diluent is preferably from 1 to 30 times, more preferably from 5 to 20 times and most preferably from 5 to 10 times the weight of the aromatic compounds to be reacted, preferably hydrogenated.

The above may also be applied for the other compounds which are reacted according to the invention. Also in this respect no limitation with regard to the solvent and diluent exists.

In the reaction of polymers examples of suitable solvents or diluents include the following:

hydrocarbons, such as hexane, cyclohexane, methylcyclohexane, heptane, octane, toluene, xylene, etc., and straight-chain or cyclic esters, such as tetrahydrofurane, dioxane, dibutylether, methyl-tert.-butylether, etc., ketones, such as methyl ethyl ketone and acetone, esters, such as ethylacetate, or amides, such as DMF and N-methylpyrrolidon.

Preferably used are cyclohexane, toluene or THF. Mixtures of these and other solvents and diluents may also be used.

If the polymer was obtained by solution polymerization, it is also possible to direct react the obtained solution comprising the polymer within the process according to the invention.

The amount of the used solvent or diluent is not particularly limited within the process according to the invention and may be freely chosen according to demand. However, such amounts are preferred which lead to a solution comprising 1 to 70, preferably 1 to 40 wt.-% of the polymer to be reacted.

Reaction

In the following the reaction is described by means of a hydrogenation as an example, wherein—in case a dehydrogenation or an oxidation is carried out—instead of hydrogen or hydrogen-containing gases gaseous hydrocarbons or oxygen-containing gases may be used under the below-described conditions.

The hydrogenation is carried out at suitable pressures and temperatures. Pressures above about $2 \cdot 10^6$ Pa, preferably above $5 \cdot 10^6$ Pa and particularly pressures of from about $1 \cdot 10^7$ to about $3 \cdot 10^7$ Pa are preferred. Preferred temperatures range from about 30 to about 250° C. and are preferably about 100 to about 220° C. and particularly about 150 to about 200° C.

The hydrogenation process can be carried out continuously or batchwise. When the process is carried out continuously a portion of the hydrogenation product leaving the reactor can be added the reactor feed upstream of the reactor. An portion of the hydrogenation product leaving the reactor is recycled as solvent, such that the proportions given under the heading "Solvents and Diluents" are attained. The remaining amount of hydrogenation product is retrieved.

When the process is carried out continuously the feed rate of the compound(s) to be hydrogenated is preferably from about 0.05 to about 3 kg per liter of catalyst per hour and more preferably from about 0.1 to about 1 kg per liter of catalyst per hour.

The hydrogenating gases used can be arbitrary gases containing free hydrogen and exhibiting no harmful amounts of catalyst poisons, such as CO. For example, reformer exhaust gases can be used. Pure hydrogen is preferably used as hydrogenating gas.

In the case of phenols and amines additionally substituted by at least one optionally substituted $C_1$–$C_{10}$ and/or alkoxy radical the isomer ratio of cis-configured to trans-configured products obtained can be varied over a wide range by varying the reaction conditions (temperature, solvents).

If an aromatic compound in which at least one amino group is attached to an aromatic core is to be hydrogenated using the catalyst defined above the hydrogenation can also be carried out in the presence of ammonia or dialkylamines, for example methylamine, ethylamine, propylamine or dimethylamine, diethylamine or dipropylamine. Suitable amounts of ammonia or monoalkylamine or dialkylamine are used, these preferably being from about 0.5 to about 50 parts by weight, more preferably from about 1 to about 20 parts by weight, based, in each case, on 100 parts by weight of the compound(s) to be hydrogenated. Anhydrous ammonia or anhydrous amines are particularly preferably used.

For oxidations generally air or pure oxygen is used. For dehydrogenations usually carbohydrates, particularly methane or natural gas, are used.

The invention is described in detail below with reference to some embodiments, where Examples 1 to 4 refer to the hydrogenation of an aromatic compound in which at least one hydroxyl group is attached to an aromatic core, and Examples 5 to 7 relate to the hydrogenation of an aromatic compound in which at least one amino group is attached to an aromatic core. Examples 8 to 12 relate to the reaction of compounds comprising C=O-groups, and Examples 13 to 16 relate to the reaction of polymers.

EXAMPLES

Preparation of Catalyst 1

An aluminum oxide support containing mesopores and macropores and having the form of 4 mm extrudates having a surface area (BET) of 238 m$^2$/g and a pore volume of 0.45 ml/g was impregnated with an aqueous ruthenium(III) nitrate solution having a concentration of 0.8 wt %. 0.15 ml/g (approximately 33% of the total volume) of the pores in the support had diameters ranging from 50 nm to 10,000 nm and 0.30 ml/g (approximately 67% of the total pore volume) of the pores in the support had diameters ranging from 2 to 50 nm. The volume of solution absorbed by the support during impregnation was approximately equal to the pore volume.

The support impregnated with the ruthenium(III) nitrate solution was then dried at 120° C. and activated (reduced) in a stream of hydrogen at 200° C. The catalyst thus produced contained 0.05 wt % of ruthenium, based on the weight of the catalyst.

Example 1

A 50 wt.-% strength solution of p-tert-butylphenol was prepared in THF. Then 2500 g/h of this solution were passed with hydrogen at a temperature of 180° C. and an overall pressure of 2.6·10$^7$ Pa through a flow reactor, which was packed with 3.2 l of the Ru catalyst described above. Following removal of the solvent, by distillation, the hydrogenation product had the following composition:

99.9% of cis,trans-4-tert-butylcyclohexanol

<0.01% of p-tert-butylphenol

Example 2

The hydrogenation was carried out as described in Example 1 except that 3500 g of the 50 wt.-% p-tert-butylphenol solution in THF were passed through the reactor at a temperature of 200° C. Following distillation of the solvent, the hydrogenation product possessed the following composition:

99.8% of cis,trans-4-tert-butylcyclohexanol

<0.01% of p-tert-butylphenol

Example 3

The hydrogenation was carried out as described in Example 1 except that a 50 wt.-% solution of p-tert-butylphenol in isobutanol was used. Following the distillation of the solvent, the hydrogenation product possessed the following composition:

67.5% of trans-4-tert-butylcyclohexanol 32.4% of cis-4-tert-butylcyclohexanol

<0.01% of p-tert-butylphenol

Example 4

In an autoclave having a capacity of 3.5 l 2 kg of a solution of 50 wt.-% of bisphenol A in THF and 500 ml of the catalyst of Example 1 were placed in a catalyst basket. Hydrogenation was then carried out at a temperature of 150° C. and under a pressure of 2·10$^7$ Pa over a period of five hours batchwise. The conversion to the desired cycloaliphatic mixture of diol isomers was quantitative, and the residual aromatics content was less than 0.01%.

Example 5

1.2 l of the catalyst 1 prepared as described above were packed into an electrically heated flow reactor. The hydrogenation of aniline was then commenced under a pressure of 2·10$^7$ Pa and at a temperature of 160° C. without previous activation. The hydrogenation was carried out continuously in ascending mode, a portion of the hydration effluent being recycled via a circulating pump and added to the starting material upstream of the reactor. The amount of hydrogenation product added as solvent was thus ten times that of the aniline. At the head of the separator from 500 to 600 l of H$_2$/h were depressurized. The amount of aniline that was continuously fed to the reactor corresponded gave a space velocity of 0.6 kg/l·h.

As a function of reaction temperature the following product compositions were attained under steady-state reaction conditions:

| Temperature (° C.) | CHA[1] (%) | DCHA[2] (%) | Aniline (%) | Cyclohexane + Cyclohexene (%) |
|---|---|---|---|---|
| 160 | 99.1 | 0.45 | 0.10 | 0.04 |
| 180 | 97.0 | 2.75 | 0.06 | 0.06 |
| 200 | 95.9 | 3.9 | — | 0.09 |

[1]CHA = cyclohexylamine;
[2]DCHA = dicyclohexylamine

Example 6

The hydrogenation was carried out as described in Example 5 except that additionally anhydrous ammonia was continuously metered in. Based on 100 wt.-% of aniline 10 parts by weight of ammonia were added. As a function of reaction temperature the following product compositions were attained under steady-state reaction conditions:

| Temperature (° C.) | CHA[1] (%) | DCHA[2] (%) | Aniline (%) | Cyclohexane + Cyclohexene |
|---|---|---|---|---|
| 180 | 99.3 | 0.08 | — | 0.07 |
| 200 | 98.4 | 0.8 | — | 0.09 |

[1]CHA = cyclohexylamine;
[2]DCHA = dicyclohexylamine

Example 7

In an autoclave having a capacity of 3.5 l there were placed 2 kg of a solution of 50 wt.-% of toluylene diamine (mixture of 2.4-;2.6-diaminotoluene isomers) in THF and 500 ml of the catalyst that was described above. Hydrogenation was then carried out at a temperature of 150° C. and under a pressure of 2·10$^7$ Pa over a period of five hours batchwise. The conversion to the desired cycloaliphatic mixture of diamine isomers was quantitative, and the residual aromatics content was less than 0.01%.

Example 8

3 l of catalyst 1 were introduced into a tube reactor (length=2500 nm, dia=45 nm). Subsequently, the reactor was filled with n-butanol and was heated to 180° C. at a hydrogen pressure of $3 \cdot 10^6$ Pa (30 bar). Then, an amount of 1 kg/h n-butylalderhyde was continuously introduced into the reactor with a flow amount of 50 l/h. The obtained reaction product was colorless and free from ruthenium.

A conversion of 99.4% and a selectivity with respect to n-butanol of 99.7, respectively based on the introduced amount of n-butylalderhyde, was determined by gas chromotagraphic evaluation.

Example 9

3 l of catalyst 1, 700 g of a copolymer of ethylene and CO ($M_w$ 5000, CO content 35% percent), dissolved in 1300 g THF, were introduced in a 3.5 l-autoclav.

Subsequently, the mixture was hydrogenated at 180° C. and $2 \cdot 10^7$ Pa (200 bar) hydrogen pressure for 5 hours. The conversions to the desired polyalcohol was 93%, based on the introduced amount of the copolymer.

Example 10

3 l of catalyst 1 were introduced into a 3.5 l-autoclav, and 2000 g benzaldehyde were introduced there into. Subsequently the mixture was hydrogenated at 180° C. and $2 \cdot 10^7$ Pa (200 bar) hydrogen pressure for 10 hours. The conversion to the desired cyclohexyl methanol was 100% at a selectivity of 96.5%, based on the introduced amount of benzaldehyde, respectively.

Example 11

3 l of catalyst 1 were introduced into a 3.5 l-autoclav, and 2000 g 2-ethylhexanaol were introduced there into. Subsequently, the mixture was hydrogenated at 180° C. and $2 \cdot 10^7$ Pa (200 bar) hydrogen pressure for 10 hours. The conversion to the desired 2-ethylhexanol was 100% at a selectivity of 97.2%, based on the introduced amount of 2-ethylhexanol, respectively.

Example 12

In a 0.3 l-stirring autoclav, 100 ml adipodimethylester was reacted at catalyst 1. The mixture was stirred for 12 hours at a hydrogen pressure of $2 \cdot 10^7$ Pa (200 bar) and a temperature of 220° C. A conversion of 98% and a yield with respect to hexandiol of 91% based on the introduced amount of adipodimethylester was determined by a gaschromatic analysis of the obtained product.

Preparation of Catalyst 2

An aluminum oxide support containing mesopores and macropores and having the form of 4 mm extrudates having a surface area (BET) of 238 $m^2/g$ and a pore volume of 0.45 ml/g was impregnated with an aqueous palladium(III) nitrate solution having a concentration of 0.8 wt %. 0.15 ml/g (approximately 33% of the total volume) of the pores in the support had diameters ranging from 50 nm to 10,000 nm and 0.30 ml/g (approximately 67% of the total pore volume) of the pores in the support had diameters ranging from 2 to 50 nm. The volume of solution absorbed by the support during impregnation was approximately equal to the pore volume.

The support impregnated with the palladium(III) nitrate solution was then dried at 120° C. and activated (reduced) in a stream of hydrogen at 200° C. The catalyst thus produced contained 0.05 wt % of palladium, based on the weight of the catalyst.

Example 13

2 kg of a solution of 25 wt % of a triblock poly(styrene-co-butadiene-co-styrene) having a molecular weight of 300,000 (weight average) in cyclohexane and 500 ml of catalyst 1 described above (0.5 wt % of $Ru/Al_2O_3$, ratio of metallic surface area to support surface area 0.001:1) were placed in an autoclave having a capacity of 3.5 l.

Hydrogenation was then carried out batchwise over a period of five hours at 100° C. and under a pressure of $1 \times 10^7$ Pa. The content of hydrogenated material in the polymer was 95%, and the aromatic content was the same as in the starting polymer. There was no reduction in molecular weight.

Example 14

2 kg of a solution of 50 wt % of polybutadiene having a molecular weight of 6,000 (weight average) in cyclohexane and 500 ml of catalyst 1 described above were placed in an autoclave having a capacity of 3.5 l. Hydrogenation was then carried out batchwise over a period of five hours at 100° C. and under a pressure of $1 \times 10^7$ Pa. The conversion content of hydrogenated material in the to the desired polymer was quantitative. There was no reduction in molecular weight.

Example 15

2 kg of a solution of 25 wt % of a poly(acrylonitrile-co-butadiene) having a molecular weight of 30,000 (weight average) in tetrahydrofuran and 500 ml of catalyst 1 described above were placed in an autoclave having a capacity of 3.5 l. Hydrogenation was then carried out batchwise over a period of five hours at 180° C. and under a pressure of $1 \times 10^7$ Pa. The content of hydrogenated material in the polymer was 92%. The nitrile content was 85% of that in the starting polymer. There was no reduction in molecular weight.

Example 16

2 kg of a solution of 25 wt % of a triblock poly(styrene-co-butadiene-co-styrene) having a molecular weight of 300,000 (weight average) in cyclohexane and 500 ml of catalyst 2 (0.5% of $Pd/Al_2O_3$) described above were placed in an autoclave having a capacity of 3.5 l.

Hydrogenation was then carried out batchwise over a period of five hours at 100° C. and under a pressure of $1 \times 10^7$ Pa. The conversion to the desired partially saturated polymer was 97%, and the aromatic content was 94% of that in the starting polymer. There was no reduction in molecular weight.

We claim:

1. A process for the hydrogenation of polymers comprising at least one C—C multiple bond in the presence of a catalyst comprising, as active metal, ruthenium alone or together with at least one Group Ib, VIIb or VIIIb metal in an amount of from 0.01 to 30 wt %, based on the total weight of the catalyst, applied to a support, or in the presence of a catalyst comprising, as active metal, palladium alone or together with at least one Group Ib, VIIb or VIIIb metal in an amount of from 0.01 to 30 wt %, based on the total weight of the catalyst, applied to a support, wherein the catalyst is characterized in that from 10 to 50% of the pore volume of the support comprises macropores having a pore diameter in the range of from 50 nm to 10,000 nm and from 50 to 90% of the pore volume of the support comprises mesopores having a pore diameter in the range of from 2 to 50 nm, the sum of said pore volumes being 100%.

2. The process of claim 1, wherein the support has a surface (BET) of from 50 to 500 m²/g.

3. The process claim 1, wherein the ratio of the metallic surface area to the support surface area (BET) ranges from 0.0005:1 to 0.3:1.

4. The process of claim 1, wherein said Group Ib, VIIb, and VIIIb metal is platinum, copper, rhenium, cobalt, nickel, or a mixture of two or more thereof.

5. The process of claim 1, wherein the support is activated charcoal, silicon carbide, aluminum oxide, silicon dioxide, titanium dioxide, zirconium dioxide, magnesium dioxide, zinc oxide, or a mixture of two or more thereof.

6. The process of claim 1, wherein the reaction is a hydrogenation, a dehydrogenation, a hydrogenolysis, an aminating hydrogenation or a dehalogenation.

7. The process of claim 1, wherein the polymer is selected from the group consisting of a polymer comprising at least one C—O double bond, a polymer comprising at least one C—N triple bond, and a mixture of two or more thereof.

8. The process of claim 1, wherein the conversion is carried out in the presence of a solvent or diluent.

* * * * *